United States Patent [19]

Wittmann et al.

[11] Patent Number: 5,112,552
[45] Date of Patent: May 12, 1992

[54] THERMOFUSIBLE AUTOADHESIVE SHAPES AND PROCESS FOR THEIR PRODUCTION

[75] Inventors: Claude Wittmann; Jean-Patrick Lambert, both of Compiegne, France

[73] Assignee: Ceca S.A., Paris la Defense, France

[21] Appl. No.: 612,116

[22] Filed: Nov. 13, 1990

Related U.S. Application Data

[62] Division of Ser. No. 76,087, Jul. 21, 1987, abandoned.

[30] Foreign Application Priority Data

Jul. 21, 1986 [FR] France ................................ 86 10552

[51] Int. Cl.$^5$ ............................................. B29C 39/12
[52] U.S. Cl. ................................... 264/255; 264/264; 264/309; 264/DIG. 57
[58] Field of Search .................. 264/255, 264, 24, 112, 264/DIG. 57, 309

[56] References Cited

U.S. PATENT DOCUMENTS

| | | | |
|---|---|---|---|
| 2,269,660 | 1/1942 | Griffin | 428/494 |
| 4,252,762 | 2/1981 | Stevenson | 264/255 |
| 4,748,796 | 6/1988 | Viel | 264/255 |

*Primary Examiner*—Jan H. Silbaugh
*Assistant Examiner*—Brian J. Eastley

[57] ABSTRACT

A thermofusible autoadhesive shape having nonadherent exterior surfaces consisting essentially of a thermofusible autoadhesive interior and an adherent exterior sheath of a compatible nonautoadhesive thermofusible material covering the entire outer surface of said thermofusible autoadhesive interior and the process of making such shape.

8 Claims, No Drawings

THERMOFUSIBLE AUTOADHESIVE SHAPES AND PROCESS FOR THEIR PRODUCTION

This application is a division of application Ser. No. 076,087, filed Jul. 21, 1987 now abandoned.

BACKGROUND OF THE INVENTION

A process is described for the conditioning of thermofusible autoadhesive (self-sticking) adhesives, in the form of blocks with a surface deprived of all sticky or pitchlike (tacky) character.

Thermofusible autoadhesive compositions are used industrially with the help of sizers which distribute the products in the molten form and whose reservoirs are generally fed from blocks or disks most often in the form of cubes, more or less flat parallelipipeds or truncated pyramids, whose volume varies from about 0.5 to 20 liters.

The thermofusible adhesives are essentially composed of fusible resins, natural or synthetic, which are solid at ambient temperature. The thermofusible autoadhesives are composed of resins of the same type, but formulated so that their surface remains more or less pitchlike (sticky or tacky) at ambient temperature.

This tackiness is the characteristic of permanent adhesives. Its counterpart is, for the disks or blocks of autoadhesive, their agglomeration when they are placed in contact without protection; adherence thereto of all sorts of soiling; and a great unpleasantness, if not a certain unhealthfulness, in handling of the same.

Certain thermofusible adhesives (hot-melts) such as, for instance, thermofusible adhesives with long setting times, without being self-sticking properly speaking, can nevertheless present the same phenomenon of autoadhesion with all its harmful consequences.

This invention thus deals with all the adhesives apt to stick to themselves by simple contact, under more or less strong pressure, and particularly the adhesives formulated from natural rubber, SBR, SIS, SBS, SEBS rubber, polychloroprene, nitrile rubber, chlorinated rubber, butyl rubber, polysulfides, ethylenevinyl acetate polymer and its copolymers, polyetheramides, polymers and copolymers of alpha-olefins, the adhesives based on natural or synthetic adhesive resins, rosin and esters of rosin, petroleum resins and synthetic resins, plasticized or unplasticized, indene-coumarene resins, waxes, pitches (tars) or bitumens (natural or modified by synthetic resins), polyesters, polyamides, polyacrylics, and the like.

All of these products have long been provided in the form of various shapes such as blocks, disks, or paving stones, individual pieces or pieces regrouped into plates of individual pieces wrapped with the help of antiadhesive sheets, generally of siliconed papers or cartons. Such a wrapping moreover generally serves as a mold during the course of making blocks by pouring the molten adhesive into such wrapping.

In commercial use can thus be found individual cube-shaped blocks of such adhesives of from one to several liters wrapped in strong silicone paper or boxes in cartons with multiple compartments (4 to 24) wrapped in silicon-containing paper, compartments whose capacities can vary from one-half liter to several liters.

These systems, although very widely distributed, present a certain number of drawbacks.

These mold-wrappings which are discarded are of high cost. Their material is a poor heat conductor and because of this, the cooling of the blocks is slow, the recovery and the finishing of the blocks after their pouring can only take place after a very long time, slowing down the manufacturing process and increasing the cost of the conditioned products.

The blocks, disks, paving blocks, and the like must be separated from their wrapping at the moment of their use, an operation which is harder and more disagreeable the greater the adhesiveness of their surface.

Attempts to solve this problem of conditioning thermofusible autoadhesive and analogous substances have comprised, for example, placing a film on them by coextrusion with a substance achieving a nonadhesive sheath or by running the autoadhesive into a metallic mold previously covered by dusting by electrostatic means (see French Patent No. 83 03387).

These procedures, as interesting as they are, are among other things unsatisfactory as far as the finishing is concerned: non-protection of the upper surface of the blocks poured into powdered forms. In addition, these techniques are poorly adapted to the manufacture of the units of autoadhesives of the various shapes and volumes demanded by the various machines charged with them.

SUMMARY OF THE INVENTION

A new process has been found of manufacturing of clocks, disks (cakes, loaves), or paving blocks or other shapes of thermofusible autoadhesives whose surface is nevertheless devoid of any adhesive property at ambient temperature, and which present themselves as blocks of autoadhesives equipped with an adherent skin of a nonautoadhesive thermofusible substance.

This skin, which has the appearance and the consistency of a cover of tissue and which forms a continuous cocoon around the autoadhesive shape is obtained by pulverization in the hot state of material which constitutes it. The process of achieving such shapes includes the following stages:

(i) pulverization of (spraying onto) the lateral walls and the bottom of a mold of the nonautoadhesive substance in the molten state;

(ii) pouring of the molten autoadhesive and filling of the mold thus prepared; and (iii) protection of the free upper surface by a fresh pulverization (spray) of nonautoadhesive thermofusible adhesive.

Upon unmolding of the shape after cooling results in a shape no longer adhering to any surface, not even to another block of the same nature.

DETAILED DESCRIPTION

Among the nonadhesive thermofusible materials which can be used for the implementation of this invention, one can cite in nonlimiting manner: waxes, paraffins, waxy forms of antioxidants, thermofusible polymers and copolymers of the ethylene-vinyl acetate type, polyethylenes copolymers ethylene maleic anhydride, ethylene acrylic acid, natural rubbers, synthetic elastomers and all of the formulations of nonautoadhesive thermofusible adhesives (hot-melts) deriving therefrom.

The unobviousness of the process and of the product obtained resides not as much in the use of a thermofusible adhesive as an antiadhesive insulating skin and as unmolding product, which is at least already very unusual, but above all in the permanency of this protective cover of skin, which preserves its integrity and its function, while fusible from 60° C. to 80° C., it receives a liquid at 110° C. to 180° C. with which it is totally miscible in the molten state.

It also resides in the pulverization of a nonadhesive thermofusible adhesive; preferably in a thickness of about 0.3 to 3 mm. In industry, the pulverization of autoadhesive is a gluing process, which is applied only with autoadhesives whose setting times are sufficiently long, which is not realized with a nonautoadhesive adhesive. At the end of the pulverization, the adhesive arrives cold on a cold support and there is no possibility of adhesion, except for later reactivation. Thus, the pulverization of a nonself-sticking thermofusible adhesive appears at least very unusual to the expert specialist in this art.

The products of the invention present advantages which one does not find or which one does not find combined in the products of the prior art. They are:

(i) the thermofusible material which constitutes the skin of the shape is intimately connected to the material of the shape and it remains adherent in its entirety and in all circumstances;

(ii) in the molten state the thermofusible material is totally compatible with the autoadhesive; it represents only 0.5 to 3% of the weight of the autoadhesive itself, it does not noticeably modify its properties of permanent tackiness and does not give rise to any liquid segregation in the melting vessels as the products for sheathing by coextrusion can do; and (iii) the shapes (blocks, disks, loaves, cakes, or paving blocks) obtained by the process of the invention exhibit all of the apparent properties of cakes of toilet soap and all of the operations and manipulations to which these latter lend themselves, complementary coatings, stacking, bagging, and the like are directly applicable to them.

The same holds true of the process of this invention which has the following advantageous characteristics:

(i) it permits indefinitely reusable metallic molds;

(ii) the cooling of the molded mass in its metallic mold is relatively rapid, and, if needed, can be accelerated by cooling of the mold;

(iii) on unmolding, the mold is freed from all of the material of the protective layer and is found to be immediately available for a new molding cycle;

(iv) conventional devices of pouring for molding of thermofusible adhesives are usable without modification for the implementation of the process according to this invention;

(v) all materials conventionally used for the gluing of autoadhesive by pulverization is suitable for the pulverization of thermofusible materials by means of minimal modifications for its adaptation; and, in many cases, no modification whatever is needed;

(vi) the material of the protective sheath or skin is a thermofusible material whose nature is not fundamentally different from that of the autoadhesive; they are often products common to the same units of production, considerably facilitating the problems of supplying and of adaptation of specifications; and (vii) the sheath or skin of nonadhesive thermofusible material possesses a non-negligible proper cohesion from which one can profit to cover the autoadhesives with low internal cohesion, which, without protection, would tend to flow on storage; such an effect is certainly not obtained with pulverulent (powdery) protections.

Furthermore, compositions for the sheath or skin can be formulated very simply from the composition of the autoadhesive which it protects according to a general principle which is to eliminate from it, in part or on the whole, the resins responsible for the stickiness, and the plasticizers, or to supply to it a surplus of nonstickly polymers or of nonadhesive waxes. Thermofusible materials are always obtained of which it is suitable to simply control the pulverizability. On the contrary, it is not always possible to have protective compositions in the form of powders for electrostatic powering, or in the form of films which can be cut and thermo-welded).

This invention will be further described in connection with the following examples which are set forth for purposes of illustration only.

EXAMPLE 1

There is used a mold of interiorly siliconed sheet metal in the form of a truncated pyramid with a square base with each side being 10 cm, and the walls having a height of 3 cm at an angle of 120° with the bottom.

A pulverization applicator is used, of the Meltex type (Fraco or Nordson), fed by a sheathing thermofusible material consisting of a conventional "hot-melt" formulation based on ethylene-vinyl acetate.

The hot-melt is pulverized into the mold for about 5 seconds in such a way as to obtain a uniform skin which covers its entire inner surface, consuming about 3 grams of product.

Into the thus coated mold, 300 g of molten autoadhesive are now allowed to run, constituted by a formula based on a conventional ethylene-vinyl acetate and kept at a temperature of 140° C.

One permits the whole to cool and the surface to attain approximately the temperature of 100° C. According to the ambient conditions this requires about 30 minutes to 1 hour and then one pulverizes onto the exposed surface of the shape the same hot-melt as above, in order to form the upper envelope (about 0.5 g of hot-melt). The mold thus filled is permitted to cool by itself for a sufficient length of time so that the mass of autoadhesive returns to the ambient temperature.

The resultant product which is in the form of an absolutely nonsticky "cake of soap" is unmolded. Such "cakes of soap" can be arranged, for instance, by 12, 24, or 48's in ordinary cartons, from which they can be removed individually after transporting and storage, without any difficulty nor unpleasantness involving adhering to each other, dirt and other materials adhering thereto, or the like.

EXAMPLE 2

(Comparative Example)

The autoadhesive of Example 1 is formed in siliconed commercial molds, organized in 6 rows of 4 cells, capable of containing 0.6 liter each.

The autoadhesive is poured at 140° C. from a tube with 4 orifices permitting the filling of 4 cells simultaneously.

Complete filling takes place by successive displacements of the carton to move the cell in front of the pouring tubes.

A temporary storage of 8 to 10 hours permits the final hardening of the mass. A lid is used for closing. This carton of 24 cells is packaged and distributed. For use, it is necessary to unmold the contents of each cell, each operation delivering a loaf of about 600 g with sticky surface, whose handling is difficult or disagreeable.

EXAMPLE 3

The material and the operating method used are those of Example 1, but the thermofusible material constituting the sheathing cover has the following composition:

Paraffin 68/70: 33% by weight
Escorez 5320 (Esso): 33% by weight
Evatane 9003 (Atochem): 34% by weight and the autoadhesive itself is a formula for the assembly of articles of feminine hygiene, whose composition is:

Cariflex TR 1102 (Shell): 25% by weight
Escorez 5320 (Esso): 45% by weight
Shellflex 451 FC (Shell): 30% by weight The composition maintained at the temperature of 155° C.

After pouring of the autoadhesive, one waits for the surface to come back to about 120° C. in order to carry out, as in Example 1, a complementary pulverization of the thermofusible material of the sheathing on the free surface.

The blocks which one obtains by this process are packaged by 12, 24, or 48 units in ordinary wrappings and they can withstand without agglomeration the ordinary conditions of transport and storage, including possible exposures to temperatures of 40° C. to 45° C. for 24 hours or more.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. The process of making thermofusible autoadhesive shapes consisting of a thermofusible autoadhesive interior and an intimately connected adherent continuous outer layer of a nonautoadhesive material having nonadherent exterior surfaces comprising:
   (a) spraying a nonautoadhesive thermofusible material in a molten state onto the walls and bottom of a mold so as to form a substantially uniform solid continuous layer thereof on said walls and bottom,
   (b) introducing a molten thermofusible autoahesive into said mold onto said layer and partially cooling the same, and
   (c) spraying nonadhesive thermofusible material onto the free upper surface of said thermofusible autoadhesive and cooling the resultant mass to ambient temperature to form a solid thermofusible adhesive shape having a continuous nonadherent exterior surface.

2. The process of claim 1, wherein the thickness of said layer on the mold walls and bottom is from about 0.3 to 3 mm.

3. The process of claim 1, wherein said nonautoadhesive thermofusible material is a petroleum wax, polyethylene, a polymer of ethylene-vinyl acetate, ethylene-maleic anhydride, ethylene-acrylic acid, or a natural rubber.

4. The process of claim 1, wherein said nonautoadhesive thermofusible material is a hot-melt adhesive.

5. The process of claim 2 wherein said nonautoadhesive thermofusible material is a petroleum wax, polyethylene, a polymer of ethylene-vinyl acetate, ethylene-maleic anhydride, ethylene-acrylic acid, or a natural rubber.

6. The process of claim 2, wherein said nonautoadhesive thermofusible material is a hot-melt adhesive.

7. The process of claim 1, wherein said nonauthoadhesive thermofusible material is a paraffin or a synthetic elastomer.

8. The process of claim 2, wherein said nonautoadhesive thermofusible material is a paraffin or a synthetic elastomer.

* * * * *